Dec. 16, 1941.  O. V. PAYNE  2,266,474
KNOCKOFF FOR ELECTRIC WARP STOP MOTION
Filed July 11, 1939
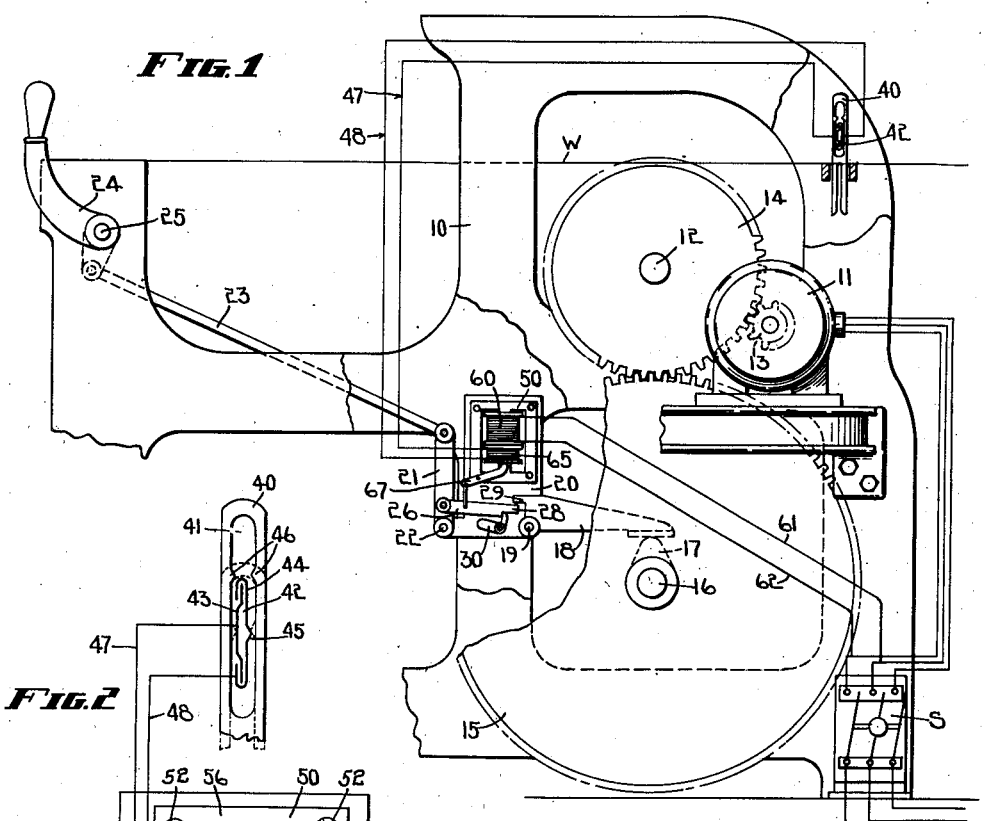
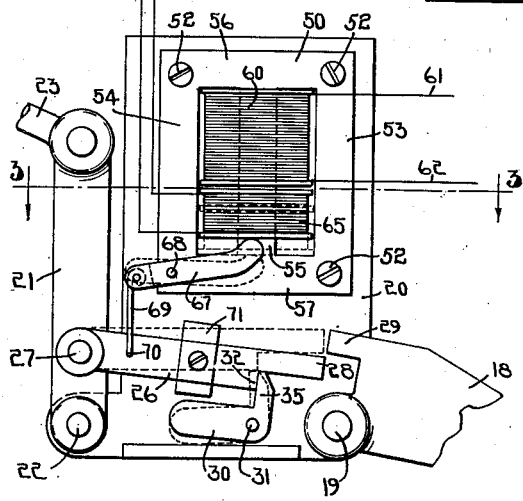
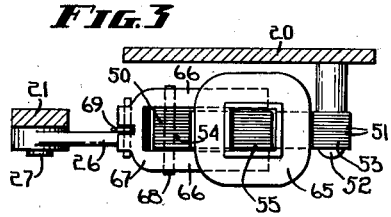
Inventor
Oscar V. Payne
Attorney Patented Dec. 16, 1941

2,266,474

UNITED STATES PATENT OFFICE 2,266,474

KNOCKOFF FOR ELECTRIC WARP STOP MOTION

Oscar V. Payne, Leicester, Mass., assignor to Crompton & Knowles Loom Works, Worcester, Mass., a corporation of Massachusetts Application July 11, 1939, Serial No. 283,858

9 Claims. (Cl. 139—336)

This invention relates to improvements in electric warp stop motions for looms and it is the general object of the invention to provide an improved electro-magnetically operated knocking-off mechanism.

Warp stop motions generally operate with a series of light weight drop wires mounted on the warp threads in such a way that breakage or slackness of the threads will permit the associated drop wire to fall. In electrical warp stop motions the descent of the drop wire closes an electric circuit containing electro-magnetic devices which act to stop the loom.

The circuit as used under modern conditions is supplied with power by a transformer having a primary winding connected to the power line during loom operation and having a secondary winding which supplies power for the stopping circuit, and a solenoid. The electric circuit therefore includes three separate and stationary windings, and a core specially constructed for an alternating magnetic field has been necessary. It is an important object of my present invention to eliminate the previously used solenoid and its movable core, and secure the necessary motion to initiate loom stoppage by separating the two coils of the transformer and mounting them for relative motion with respect to each other.

It is a further object of my present invention to locate a movable coil in a magnetic field and provide for closing a circuit including the coil when the loom is to be stopped to develop an induced current in the coil which will set up a counter-magnetic field resulting in motion of the coil relatively to the primary magnetic field. I have chosen to illustrate this feature of my invention by mounting the movable coil around a mass of magnetizable material in which an alternating magnetic field is set up by a magnetizing coil. The movable or induction coil lies in the path of the rising and falling lines of magnetic force and has generated in it an electro-motive force, so that closure of a circuit including the induction coil by some such device as a drop wire will cause an induced current to flow through the induction coil and thereby set up a magnetic field which tries to move away from the primary field and in doing so produces a motion of the induction coil which can be utilized to initiate loom stoppage. I do not wish, however, to be limited to the particular form of the invention to be described hereinafter, inasmuch as it is sufficient if falling of the drop wire or the like results in the production of opposed magnetic fields the effect of which is to cause motion of a controlling part of the loom.

In my prior Patent No. 1,873,465 I have shown an electrically controlled knock-off mechanism including a regularly oscillating lever and a force transmitter normally out of the path of the lever but connected to the shipping mechanism of the loom. As shown in that patent the falling of the drop wire causes energization of a solenoid which moves the force transmitter into the path of the lever so that the actuator becomes effective to impart a stopping motion to the loom shipper mechanism. In carrying my present invention into effect I prefer to employ the structure of my prior patent, except for the omission of the solenoid, and make provision for moving the force transmitter into the path of the actuator lever whenever the induction coil is moved.

With these and other objects in view as the description proceeds, my invention resides in the combination and arrangement of parts hereinafter described and set forth.

In the accompanying drawing, wherein a convenient embodiment of my invention is set forth, Fig. 1 is a side elevation of a part of a loom having my invention applied thereto, Fig. 2 is an enlarged view of a portion of Fig. 1 with the drop wire shown diagrammatically and the parts in running position in full lines and in stopping position in dotted lines, and Fig. 3 is a horizontal section on line 3—3 of Fig. 2.

The loom to which my invention can be applied comprises a frame 10 on which is mounted a driving motor 11 geared to top shaft 12 by means of pinion 13 and gear 14. The latter meshes with a second gear 15 having twice the number of teeth of gear 14 to turn the bottom shaft 16 once for every second revolution of the top shaft 12. A cam 17 secured to the bottom shaft causes rising and falling of a knock-off lever 18 which is pivoted as at 19 to a plate 20 secured to the loomside in any approved manner and on which the knock-off mechanism is mounted. An arm 21 is pivoted as at 22 to the plate 20 and is connected by means of a rod 23 to a conventionally shown shipper handle 24 on the shipper shaft 25. A force transmitter 26 is pivoted as at 27 to the arm 21 and has a reduced end 28 for engagement with a lug 29 on the lever 18. A dog 30 is pivoted as at 31 to the plate 20 and is normally held in the full line position of Fig. 2 by a shoulder 32 on the transmitter 26.

When in the full line position shown in Fig. 2 the lever 18 rocks back and forth during loom operation and the lug 29 passes over the reduced end 28 of the transmitter, hence the latter remains at rest and the arm 21, rod 23 and the shipper handle 24 remain stationary. When the transmitter 26 is raised in a manner to be set forth hereinafter to the dotted line position of Fig. 2 a finger 35 on the dog moves to the left under the transmitter 26 to hold the latter in its elevated position. The left end 30 of the dog may be counter-weighted to insure rocking thereof. On the next oscillation of lever 18 to the left the lug will engage reduced end 28 and move the transmitter 26 to the left, thereby rocking the arm 21 to move the shipper handle to stopping position by a force transmitted through rod 23.

The drop wire 40 which I prefer to employ has a slot 41 in the upper end thereof through which extends the contact bar designated generally at 42. This bar includes an inner plate or electrode 43 insulated from the outer grounded electrode 44. The latter has a protruding rib 45 which cooperates with one of the bosses 46 of the drop wire. The other boss is adapted for engagement with the insulated electrode 43. When a warp thread W is intact the drop wire is supported in the full line position shown in Fig. 2 and the bosses 46 are unable to connect the electrodes 43 and 44 electrically. When the warp thread slackens or breaks, however, the drop wire falls to the dotted line position shown in Fig. 2, thereby electrically connecting the electrodes.

The knock-off mechanism may be the same as that set forth in my aforesaid patent to which reference may be had for a further description, and the drop wire and contact bar 42 may be the same as that shown in my prior Patents Nos. 1,852,217 and 1,873,466.

In carrying my present invention into effect I provide a magnetic body 50 formed with a series of laminations 51 as suggested in Fig. 3 and held to the plate 20 by bolts 52. The magnetic body 50 has right and left side bars 53 and 54, respectively, between which extends an intermediate bar 55 preferably parallel to and equally spaced from the bars 53 and 54. The bars already described may be magnetically connected together by horizontal top and bottom cross bars 56 and 57, respectively. The magnetic body 50 provides a closed circuit for any magnetism which may be developed in the intermediate or central bar 55.

I provide a normally energized coil 60 which is fixed to the upper part of the intermediate bar 55 and is connected by wires 61 and 62 to a source of electric power through a switch S. As shown in Fig. 1 the switch S has three poles for the three wires of a three phase electric circuit, while the wires 61 and 62 are connected to two of the three wires whenever the switch S is closed. It is not thought necessary to give further description of the relation between the switch S and the coil 60 and reference may be had to my prior Patent No. 1,873,147 for additional description of the manner in which an electric warp stop motion knock-off can be energized from a three-phase circuit.

Below the coil 60 and surrounding the intermediate bar 55 is a movable or floating induction coil 65 which is connected to the wires 47 and 48. This coil is supported by the two arms 66 of a yoked lever 67 pivoted as at 68 for convenience to the magnetic body 50. A link 69 connects the left end of lever 67 to the force transmitter 26 as at 70. A counter-weight 71 movable to adjusted position on the transmitter 26 provides means for counter-balancing the weight of the movable coil. Under normal conditions the weight of the transmitter 26 and the counter-weight 71 is sufficient to lift the right ends of the arms 66 to the full line position of Fig. 2 and therefore hold the coil 65 in a position adjacent to the energized or actuating coil 60.

In operation, normal running of the loom with the warp threads in proper condition will leave the parts in the full line position shown in Fig. 2. The constantly energized coil 60 creates an alternating field of magnetic force which induces an electro-motive force in the induction coil 65. When one of the warp threads breaks or becomes slackened the drop wire corresponding thereto falls to connect wires 47 and 48, thereby establishing a closed circuit through the movable coil 65. I find that when these conditions exist the coil 65 is repelled from the energized coil 60, thereby depressing the arms 66 and causing the connected parts to move to the dotted line position in Fig. 2 to effect loom stoppage. The alternating magnetic field set up in the intermediate bar 55 by the coil 60 is believed to induce a current in coil 65 when the wires 47 and 48 are connected to create a magnetic field around the movable coil 65 which is repelled by the field created by the actuator coil 60.

From the foregoing it will be seen that I have provided a simplified stopping circuit for an electric warp stop motion which eliminates the usually employed solenoid and its movable core. The usual transformer as such is omitted, although I use two sets of windings similar to those found on the transformer, but one of the windings is mounted so that it can be moved by magnetic repulsion derived from the other winding. By eliminating the solenoid I reduce the tendency of the stopping circuit to produce sparks at the contact bar.

Having thus described my invention it will be seen that changes and modifications may be made therein by those skilled in the art without departing from the spirit and scope of the invention and I do not wish to be limited to the details herein disclosed, but what I claim is:

1. In a knock-off mechanism for a loom stop motion, a regularly moving actuator, a knock-off lever to be rocked to stop the loom, a force transmitter normally out of force transmitting position relatively to the actuator and lever, a single electric coil normally energized to create an alternating magnetic field, a second electric coil normally stationary and capable of movement in the magnetic field, said second coil being located within the field of the first named coil a normally open electric circuit including the movable coil, means to close the circuit upon the occurrence of a fault in the weaving operation of the loom, and thereby establish a second magnetic field by current induced in the said second electric coil whereupon the said second electric coil moves away from the said single electric coil, and means to cause the force transmitter to move to force transmitting position relatively to the actuator by movement of the said second electric coil.

2. In a knock-off mechanism for a loom stop motion, a regularly moving actuator member, a knock-off member to be moved by a force derived from the actuator member to effect loom stoppage, a force transmitter normally out of force transmitting position relatively to the members, a primary electric coil normally excited to create an alternating magnetic field, a secondary coil in the magnetic field mounted for movement relatively to the primary coil and normally adjacent to the primary coil, a normally open electric circuit including the secondary coil, means to close the circuit when the loom is to be stopped, thereby establishing a second magnetic field by current induced in the secondary coil and causing relative motion between the coils, and means connecting the secondary coil to the force transmitter to move the latter to force transmitting position relatively to the members when the secondary coil moves relatively to the primary coil.

3. In a knock-off mechanism for a loom stop motion, a source of alternating current, a regularly moving actuator member, a knock-off member to be moved to stop the loom by a force derived from the actuator member, a force transmitter normally out of force transmitting position relatively to the members, a single magnetizing coil to create an alternating magnetic field of force by reason of connection to and energization by said source of alternating current, an induction coil normally open circuited and located in the magnetic field adjacent to the magnetizing coil and movable relatively thereto, means to short-circuit the induction coil when the loom is to be stopped and thereby allow to be established an induced magnetic field by the induction coil effective to move the latter with respect to the magnetizing coil, and means operated through and by motion of the induction coil to move the force transmitter into force transmitting relationship with respect to the members.

4. In a knock-off mechanism for a loom stop motion, a source of alternating current, a regularly moving actuator member, a knock-off member to be moved to stop the loom by a force derived from the actuator member, a force transmitter normally out of force transmitting position relatively to the members, a single coil to establish an alternating magnetic field of force by reason of connection to and energization by said source of alternating current, a normally open induction coil in the field of force and movable relatively to the latter, a normally raised warp drop wire, means to short circuit the induction coil when the drop wire falls and thereby establish an induced magnetic field around the induction coil effective to move the latter with respect to the alternating field, and means operated by motion of the induction coil to move the force transmitter to force transmitting position with respect to the members.

5. In a warp stop motion knock-off mechanism for a loom, a source of alternating current, a regularly moving actuator member, a normally stationary knock-off member to be moved by a force derived from the actuator member to effect loom stoppage, a normally raised warp drop wire, a single coil to create an alternating magnetic field of force by reason of connection to and energization by said source of alternating current, a normally open circuited coil located in the field and movable relatively thereto, means to short circuit the coil when the drop wire falls and thereby establish by induction a magnetic field around the coil effective to move the latter with respect to the first named magnetic field, and means controlled by motion of the coil to transmit a force from the actuator member to the knock-off member when the coil moves to cause loom stoppage.

6. In a knock-off mechanism for a loom stop motion, a source of alternating current, a regularly moving actuator member, a knock-off member to be moved to stop the loom by a force derived from the actuator member, a force transmitter normally out of force transmitting position relatively to the member, a single primary coil to create an alternating magnetic field of force by reason of connection to and energization by said source of alternating current, an induction coil in the field of force, a movable support for the induction coil, connections between the support and the force transmitter to hold the induction coil adjacent to the magnetizing coil when the force transmitter is out of force transmitting position, means to short-circuit the induction coil when the loom is to be stopped and thereby allow to be established an induced magnetic field around the induction coil causing the latter to move away from the magnetizing coil, motion of the induction coil away from the magnetizing coil being effective through said connections to move the force transmitter into force transmitting relation with respect to the members.

7. In a knock-off mechanism for a loom stop motion, a source of alternating current, a regularly moving actuator member, a knock-off member to be moved to stop the loom by a force derived from the actuator member, a force transmitter normally out of force transmitting position relatively to the members, a single coil connected to and energized by the source of alternating current to establish an alternating magnetic field during loom operation, a second normally open circuited coil located in the field of the first coil and capable of establishing a magnetic field induced by and opposed to the first magnetic field when said second coil is close circuited and said second coil movable relatively to the first magnetic field, means to establish the second magnetic field when the loom is to be stopped by causing the second coil to be close circuited and thereby effect relative motion of the second coil with respect to the first magnetic field, and mechanism controlled by said relative motion of the second coil to move the force transmitter into force transmitting relationship with respect to said member.

8. In a knock-off mechanism for a loom stop motion, a source of alternating current, a regularly moving actuator, a knock-off lever to be rocked to stop the loom, a force transmitter normally out of force transmitting position relatively to the actuator and knock-off lever, a stationary single coil connected to and normally energized by the source of alternating current to create an alternating magnetic field, a movable coil normally stationary in said magnetic field, a normally open circuit including the movable coil, means to close the circuit including the movable coil upon the occurrence of a fault in the weaving operation of the loom and thereby induce a second magnetic field in the movable coil effective to move the latter away from the first coil, and means operated by movement of the movable coil away from the stationary single coil to cause the force transmitter to move to force transmitting position relatively to the actuator and lever to cause the actuator to move the lever.

9. In a knock-off mechanism for a loom stop motion, a source of alternating current, a regularly moving actuator member, a knock-off member to be moved to stop the loom by a force derived from the actuator member, a force transmitter normally out of force transmitting position relatively to the members, a single electric coil connected to and energized by the source of alternating current to create an alternating magnetic field of force, a normally open circuited induction coil in said magnetic field and capable of movement with respect to said magnetic field, means to short-circuit the induction coil when the loom is to be stopped and thereby cause the induction coil to establish an induced magnetic field opposed to the first magnetic field to effect movement of the induction coil relatively to the first magnetic field, and means operated by the induction coil when the latter is moved by the magnetic force of the opposed magnetic field to move the force transmitter into force transmitting relationship with respect to the members.

OSCAR V. PAYNE.